Aug. 7, 1923.
K. SCHEMBER ET AL
1,464,114
TRAVELING POISE FOR WEIGHING MACHINES
Filed June 9, 1920
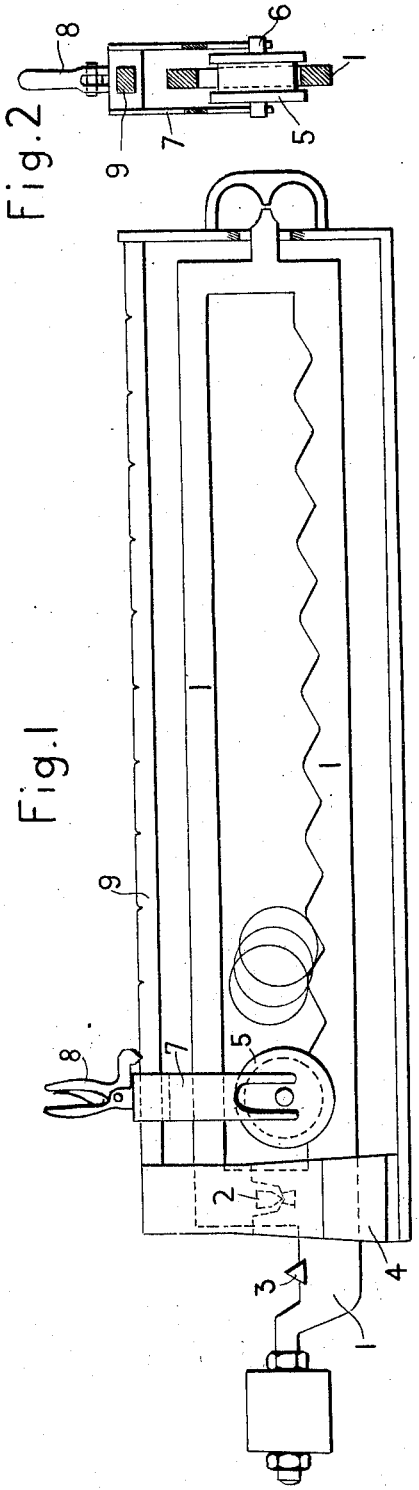
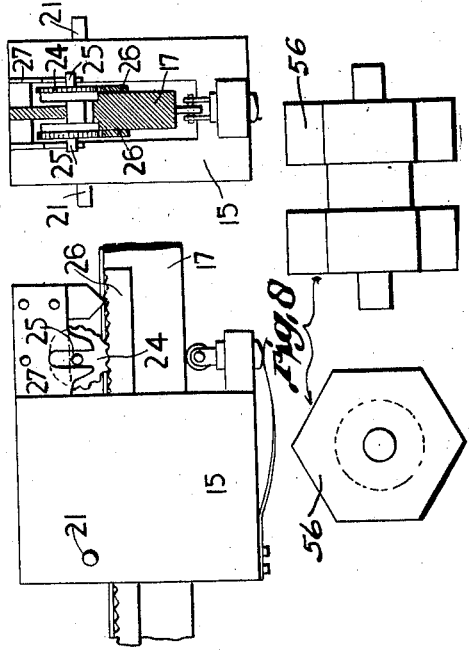
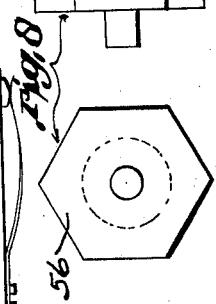
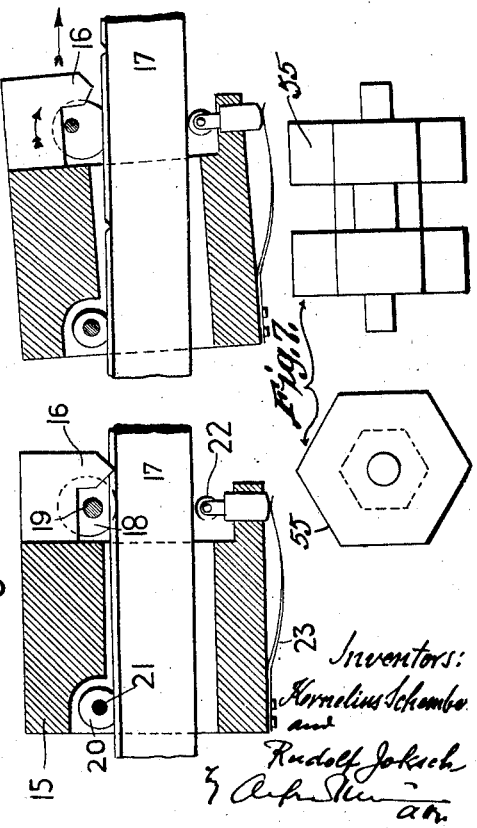
Inventors:
Kornelius Schember
and
Rudolf Joksch Patented Aug. 7, 1923.

1,464,114

UNITED STATES PATENT OFFICE.

KORNELIUS SCHEMBER, OF ATZGERSDORF, AUSTRIA, AND RUDOLF JOKSCH, OF PRAGUE-KAROLINENTHAL, CZECHOSLOVAKIA.

TRAVELING POISE FOR WEIGHING MACHINES.

Application filed June 9, 1920. Serial No. 387,769.

*To all whom it may concern:*

Be it known that we, KORNELIUS SCHEMBER, a citizen of the Republic of Austria, residing at Atzgersdorf, Austria, Republic of Austria, and RUDOLF JOKSCH, a citizen of the Czechoslovakian Republic, residing at Prague-Karolinenthal, Czechoslovakia, 12 Komenskygasse 12, have invented certain new and useful Improvements in Traveling Poises for Weighing Machines, of which the following is a specification.

In the steelyards as heretofore constructed, in order to obtain accurate weighing, the knife-edge for engaging the notches, being either rigidly connected to the travelling poise or connected thereto so as to be capable of yielding in a vertical direction, and serving for the adjustment of the poise on the graduation (notch) of the scale of the steelyard corresponding to the position of the poise, must be adjusted by hand exactly into the notch. The accuracy of the weighing thus depends on the precision and care of the person that does the weighing and moreover involves a corresponding expenditure of time.

Our invention relates to a construction of poise which renders the exact weighing and the time taken thereby independent of the attendant, and the weighing time is reduced to a minimum. This is effected because the poise is not moved directly by hand to the position of balance but is moved approximately to the notch corresponding to the position of balance by means of a carrier which does not interfere with the free movement of the steelyard or other moving part of the weighing machine or balance, whereupon the poise by reason of its own weight or by the action of a spring seats itself automatically into this notch.

In the accompanying drawings two embodiments of our poise arrangements are shown by way of example.

Figures 1 and 2 are respectively a side elevation and a transverse section of a steelyard and poise constructed according to our invention.

Figures 3 to 6 illustrate a modification, comprising a cube shaped poise which is shown in Figures 3 and 4 in two positions in vertical longitudinal sections, in Figure 5 in side elevation, and in Figure 6 in end elevation partly in transverse section.

Figs. 7 and 8 show the use of a polygonal guide roller.

Figures 1 and 2 show a steelyard 1 made in the form of an open frame, which is mounted with its knife-edges 2 in bearings 4; the load to be weighed is taken by the load knife-edges 3. The lower part of the steelyard frame is notched on its upper edge and supports a poise 5 made in the form of a roller, the trunnions 6, 6 of which projecting from both sides extend into the forked lower end of the carrier 7. The trunnions 6, 6 have sufficient play in the forks to obtain perfectly free play of the poise when the latter is resting on the steelyard. The carrier 7 is movable along the graduated guide bar 9 of the balance frame, which is separate from the steelyard. By means of the catch 8, which is made for example as a spring controlled lever, the carrier 7 can be secured on the scale of the guide bar 9. The distances between the scale-notches on the guide bar 9 are equal and correspond with the distances apart of the notches of the scale of the steelyard 1.

The operation of weighing with this construction of poise is as follows:—When the load acting on the load knife edge 3 is to be weighed, the catch 8 of the carrier 7 is grasped and it is pushed towards the outer end of the steelyard, i. e. toward the right in Fig. 1, during which operation the catch 8 is allowed to slide lightly on the bar 9. The poise 5 is carried along with the carrier and rolls from one notch of the steelyard to another, until it comes to rest in the notch corresponding to the position of balance. In the meantime the spring catch 8 of the carrier 7 has reached the corresponding notch in the guide bar 9 and is there released. Thereupon any contact between the poise 5 and the carrier 7 ceases, and thus free play of the steelyard is obtained. The three circles drawn in the third notch of the steelyard, Figure 1, indicate the automatic rolling of the poise into the notch by its own weight. The return of the poise to the zero point of the steelyard scale after the weighing is accomplished takes place by means of the carrier in the same manner as before. Instead of the cylindrical poise a polygonal roller 55 or 56 as shown in Figs. 7 and 8 for example can be employed in this form of construction. The movement of the carrier 7 can also take place mechanically instead of by hand and can be used for actuating any desired weight-registering apparatus.

The method of operation of the second embodiment of the invention shown in Figures 3 to 6 is based essentially on the same principles as above described. The poise 15 in the form of a rectangular block, is movable by means of the pairs of rollers 18 and 20 on the offset edges of the prismatic steelyard 17, for which purpose the rollers 20 are mounted on a shaft 21 the ends of which form trunnions projecting from the sides of the poise.

These trunnions serve as points of engagement for the forks of the carrier which is not shown in this case. The pair of rollers 18 are rigidly connected by the eccentric 19 and carry on the outside the two gear pinions 24 and the shaft ends 25, which fit exactly into vertical slots in guide plates 27 (Figures 5 and 6). The knife-edge 16 rigidly connected to the poise has its horizontal part extending between the rollers 18, so that when these rollers turn the knife edge 16, the eccentric 19 and the poise are consequently raised and lowered, the poise turning in a vertical direction about the shaft 21 of the rollers 20. Figure 3 shows the eccentric 19, and also the poise 15 in the lowest position, the knife-edge is consequently in one of the notches of the steelyard. Figure 4 on the other hand shows the raised position of the eccentric 19 and of the poise 15 together with the knife-edge 16; if the poise is moved by the carrier in the direction of the arrow the eccentric is turned over its upper dead point. In order to prevent sliding of the rollers 18, 18 on the running edges of the steelyard 17, and consequently to ensure the turning of the eccentric during the moving of the poise, there are secured at both sides of the steelyard toothed plates 26, with the teeth of which the pinions 24 engage. The operation of this embodiment of the invention is as follows: The poise 15 is moved by the carrier from its initial position shown in Fig. 3. In this operation the eccentric 19 turns from its lowermost position upwards and raises the knife-edge 16. As soon as the eccentric has passed its upper dead point, the weight of the poise acts upon it and tends to press it into its lowermost position. Consequently the whole poise has the tendency to roll automatically to the next notch and to seat itself in position there by means of the knife edge. In the case where the weight of the poise is not sufficient for this, it can be assisted by the action of a spring. In Figs. 3–6, the arrangement of a spring of this kind is shown by way of example. This spring imparts to the poise the tendency to turn downwards about the axis of the trunnions 21. The spring 23 fixed to the poise presses at its free end on the holder of a roller 22, which holder is guided in the body of the poise and the roller bears against the lower edge of the steelyard, i. e. it rolls against the latter in the movement of the poise.

What we claim is:

1. In a steelyard weighing apparatus, the combination with a notched steelyard frame and a balance frame, of a movable poise, a carrier movable along the balance frame and engaging the said poise so as to take it along when moved in either direction, the arrangement being such that the poise on reaching the balance position is released by the said carrier to seat itself automatically in the notch of the said steelyard frame corresponding to the balance position.

2. In the combination as specified in claim 1, a spring-controlled lever provided on the said carrier for moving the same, and a means on said lever for engaging notches in the said balance frame to thereby arrest the said carrier in position.

3. The combination as set forth in claim 1, in which the poise consists in a block provided with two pairs of guide rollers and carrying a knife-edge for engaging the notches in the said steelyard frame, one of the said pairs of rollers being mounted on an eccentric so as to successively raise and lower the said block when moved along the said frame, toothed bars on said frame and toothed gears on the said pair of rollers adapted to engage the said toothed bars so as to prevent a sliding motion of the said rollers.

KORNELIUS SCHEMBER.
RUDOLF JOKSCH.